United States Patent [19]

Kawai et al.

[11] Patent Number: 5,129,032
[45] Date of Patent: Jul. 7, 1992

[54] OPTICAL FIBER DISPLAY APPARATUS, FIXING DEVICE FOR OPTICAL FIBER USED THEREIN, AND DECORATIVE OPTICAL FIBER USABLE THEREIN

[75] Inventors: Toshinori Kawai, Toyohashi; Yoshihiro Shimoshimbara; Yoshio Ueda; Shozo Shimizu, all of Tokyo; Toshinobu Shiba; Yukio Harata, both of Toyohashi, all of Japan

[73] Assignee: Mitsubishi Rayon Company Ltd., Tokyo, Japan

[21] Appl. No.: 691,834

[22] Filed: Apr. 26, 1991

[30] Foreign Application Priority Data

Apr. 27, 1990 [JP] Japan .................................... 2-46436

[51] Int. Cl.⁵ .............................................. G02B 6/00
[52] U.S. Cl. ............................................... 385/901
[58] Field of Search ........................ 350/96.10, 96.24; 362/32

[56] References Cited

U.S. PATENT DOCUMENTS

| | | | |
|---|---|---|---|
| 4,867,820 | 9/1989 | Jacobson et al. | 350/96.10 X |
| 4,917,448 | 4/1990 | Oppenheimer | 350/96.10 |
| 5,013,109 | 5/1991 | Zelan et al. | 350/96.10 |

FOREIGN PATENT DOCUMENTS

| | | |
|---|---|---|
| 56-69705 | 6/1981 | Japan . |
| 56-86214 | 7/1981 | Japan . |
| 59-7403 | 1/1984 | Japan . |
| 60-49501 | 4/1985 | Japan . |
| 60-78004 | 5/1985 | Japan . |
| 60-125601 | 8/1985 | Japan . |
| 61-60404 | 4/1986 | Japan . |
| 63-182004 | 11/1988 | Japan . |

*Primary Examiner*—Akm E. Ullah
*Attorney, Agent, or Firm*—Oblon, Spivak, McClelland, Maier & Neustadt

[57] ABSTRACT

An optical fiber display apparatus comprises a display panel, and a plurality of optical fibers, one end of each being optically connected to a light source, and the other end thereof being implanted in the panel from one surface side thereof, so that the end face thereof is exposed at the other surface of the panel. A fixing device is used for implanting of the fibers, and includes a sleeve detachably inserted and held in a through hole formed in the panel, and a ferrule detachably inserted in the sleeve from a side of one end thereof and held therein, the other end of each of the fibers being received and fixed in the ferrule. A second ferrule may be detachably inserted in the sleeve from a side of the other end thereof, to be thus suspended from the other surface of the panel. One end of a decorative optical fiber is received and fixed in the second ferrule to be thus suspended from the display panel. Preferably, the decorative fiber comprises a core, and a cladding surrounding the core, a plurality of cone-shaped openings being discretely formed in the surface thereof so that light conducted in the core is allowed to partially leak out of the cone-shaped openings, whereby the decorative effect is increased.

15 Claims, 5 Drawing Sheets

OPTICAL FIBER DISPLAY APPARATUS, FIXING DEVICE FOR OPTICAL FIBER USED THEREIN, AND DECORATIVE OPTICAL FIBER USABLE THEREIN

BACKGROUND OF THE INVENTION

1) Field of the Invention

The present invention relates to a display apparatus utilizing optical fibers, and a fixing device for an optical fiber used in such a display apparatus. The present invention also relates to a decorative optical fiber which may be advantageously utilized when the display apparatus is constituted as a decorative illumination such as a chandelier.

2) Description of the Related Art

In an optical fiber display apparatus, a plurality of optical fibers are implanted in a display panel in such a manner that an end face of each optical fiber is exposed on a display surface of the panel. The other end faces of the optical fibers are optically connected to a light source, so that a light guided from the light source through each optical fiber is emitted from the exposed end face thereof, whereby images, characters, marks, symbols or the like can be displayed on the display surface of the panel. This optical fiber display apparatus has many advantages or merits in comparison with another display apparatus. For example, the optical fiber display apparatus can provide a very large display area which cannot be realized by a cathode-ray tube (CRT) display. Also, maintenance of the optical fiber display apparatus is easier than that of an LED large size display apparatus having a display panel on which a plurality of light emitting devices (LED) are mounted.

Conventionally, the optical fibers in the display panel are implanted by inserting the optical fibers through holes formed in the display panel, an adhesive is applied to a location at which each optical fiber is inserted, and after the adhesive has hardened, the exposed end faces of the implanted optical fibers are polished by a suitable abrasive machine or tool. These procedures are very troublesome, especially on site, and although the optical fiber display apparatus may be assembled in a factory, this is not preferable because it is costly to transport the assembled apparatus, due to a bulkiness thereof and because the optical fibers may be broken during the shipping thereof. In the conventional implanting operation, an exchange of a broken optical fiber for a new one is very difficult, due to the adhesive holding the optical fibers in the panel.

The display apparatus may be constituted as a decorative illumination, such as a chandelier, by extending and suspending the optical fibers from the display surface of the panel. In this case, the disadvantages as mentioned above are substantially the same for the decorative illumination.

In the optical fiber decorative illumination, the suspended optical fibers are frequently notched so that light leaks out of the notches of each optical fiber, resulting in an increase of an optically decorative effect of the optical fibers. Nevertheless, the conventionally notched or decorative optical fibers do not sufficiently increase the optically decorative effect, because the notches are formed as a V-shaped groove. Namely, the V-shaped groove must be shallow, to prevent a breaking of the decorative optical fiber, as much as possible, at the notched location. That is, if the notches are deeply formed in the optical fibers, to thereby increase the optically decorative effect thereof, these decorative optical fibers are very easily broken.

SUMMARY OF THE INVENTION

Therefore, an object of the present invention is to provide an optical fiber display apparatus wherein a plurality of optical fibers can be easily implanted in a display panel without the use of an adhesive, and wherein a broken and implanted optical fiber can be easily and quickly exchanged for a new one.

Another object of the present invention is to provide a fixing device for an optical fiber used in the display apparatus, by which an easy implanting of the optical fiber and exchange of a broken optical fiber for a new one can be carried out.

Yet another object of the present invention is to provide a decorative optical fiber used in a decorative illumination, in which openings are formed to leak sufficient light out of each of the openings, to thereby increase an optically decorative effect in such a manner that the decorative optical fiber is made as nonsusceptible to breakage as possible.

In accordance with the present invention, there is provided an optical fiber display apparatus comprising: a display panel; a plurality of optical fibers, one end of each being optically connected to a light source and the other end thereof being implanted in the display panel from one surface side thereof, so that the end face thereof is exposed on the other surface of the display panel; and means for implanting the other end of each of the optical fibers in the display panel. The implanting means includes a sleeve member detachably inserted and held in a through hole formed in the panel, and a ferrule member detachably inserted and held in the sleeve member, the other end of each of the optical fibers being received and fixed in the ferrule member, whereby the optical fiber can be easily and quickly implanted in the display panel. The implanting means may further include a quick nut engageable with the sleeve member inserted in the through hole in the display panel, whereby the sleeve member can be held therein. Preferably, the ferrule member is made of a plastically deformable material so that the fixing of the other end of each of the optical fibers in the ferrule member can be easily and quickly carried out by a partial swaging of the ferrule member.

According to another aspect of the present invention, there is provided an optical fiber display apparatus comprising: a display panel; a first plurality of optical fibers, one end of each being optically connected to a light source and the other end thereof being implanted in the display panel from one surface side thereof; a second plurality of optical fibers, one end of each being implanted in the display panel from the other surface side thereof, so that the first plurality of optical fibers are optically connected to the second plurality of optical fibers at the end faces thereof, respectively, while the second plurality of optical fibers are suspended from the other surface side of the display panel; and means for implanting the other end of each of the first plurality of optical fibers and the one end of each of the second plurality of optical fibers in the display panel. The implanting means includes a sleeve member detachably inserted and held in each of the through holes, a first ferrule member detachably inserted in the sleeve member from one end side thereof, and held therein, and a second ferrule member detachably inserted in the sleeve member from the other end side thereof and held therein, the other end of each of the first plurality of optical fibers and the one end of each of the second plurality of optical fibers being received and fixed in the first and second ferrule members, whereby the implanting of the first and second pluralities of optical fibers in the display panel can be easily and quickly carried out. The implanting means may further include a quick nut engageable with the sleeve member inserted in the through hole in the display panel, whereby the sleeve member is held therein. Preferably, the first and second ferrule member are made of a plastically deformable material so that the fixing of the other end of each of the first plurality of optical fibers in the first ferrule member and of the one end of each of the second plurality of optical fibers in the second ferrule member can be carried out by a partial swaging of the first and second ferrule members, respectively.

In accordance with yet another aspect of the present invention, there is provided a decorative optical fiber which can be advantageously used in an optical fiber display apparatus which is constructed as a decorative illumination such as a chandelier. The decorative optical fibers according to the present invention comprises a core and a cladding surrounding around the core, and is characterized in that a plurality of cone-shaped openings are discretely formed over the surface thereof so that a light conducted in the core partially leaks out of the cone-shaped openings, whereby a decorative effect can be increased due to the partial leakage of light. The cone-shaped openings may be filled with a transparent adhesive material, so that the decorative optical fiber can be strengthened against a breakage thereof. Preferably, the adhesive material is made proud at the surface of the cladding, so that the leaked light is scattered at the raised portion of the adhesive material, whereby the decorative effect can be further increased due to this scattering of light.

BRIEF DESCRIPTION OF THE DRAWINGS

The other objects and advantages of the present invention will be better understood from the following description, with reference to the FIG. 1 is a schematic view of an optical fiber display apparatus according to the present invention.

DESCRIPTION OF THE PREFERRED EMBODIMENTS

Figure 1:
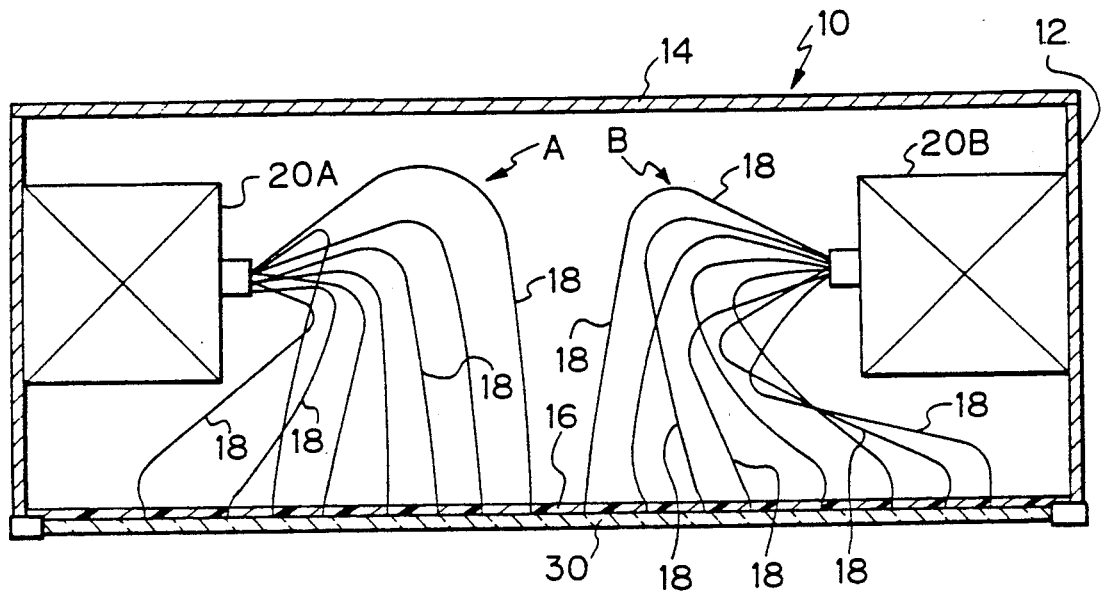

FIG. 1 schematically shows an optical fiber display apparatus constituted such that a fixed image is decoratively displayed. This optical fiber display apparatus is intended to be suspended from a ceiling of a hall or room.

Figure 2:
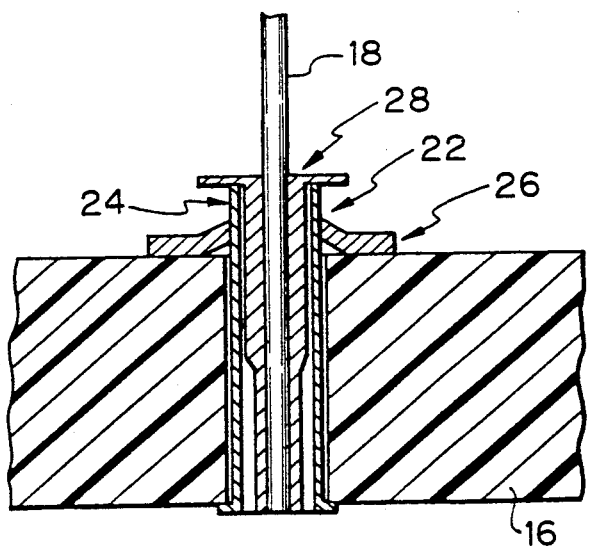
FIG. 2 is an enlarged longitudinal sectional view of a fixing device used in the optical fiber display apparatus shown in FIG. 1.
Figure 3:
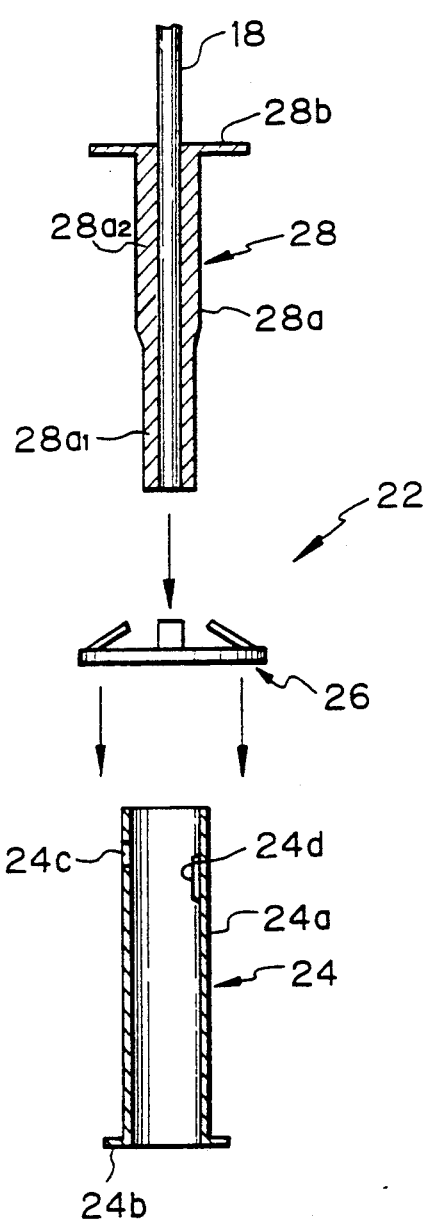
FIG. 3 is an exploded view of the fixing device shown in FIG. 2.

The display apparatus comprises a box-like casing 10 preferably made of a suitable composite material or a suitable hard synthetic resin material, and including a side wall frame 12, a top wall 14 integrally formed therewith, and a bottom wall 16 detachably attached thereto. The bottom wall 16 constitutes a display panel in which a plurality of through holes are formed, these through holes defining the fixed image to be displayed on an outer display surface of the panel 16. The display apparatus also comprises a plurality of optical fibers 18, which are divided into two groups A and B. The optical fibers of group A are gathered together at one end thereof, and are optically connected to a light source 20A attached to an inner wall portion of the side wall frame 12. Similarly, the optical fibers of group B are gathered together at one end thereof, and are optically connected to a light source 20B attached to an opposed inner wall portion of the side wall frame 12. The other end of each of the optical fibers 18 of the groups A and B is implanted in the panel 16 by using a fixing device 22 as shown in FIGS. 2 and 3.

The fixing device 22 comprises a sleeve member 24 inserted to the through hole formed in the panel 16, a push-on or quick nut 26 for engaging with and fastening the inserted sleeve member 24 to the panel 16, and a ferrule member 28 held by the sleeve member 26 and having the optical fiber 18 fixed therein. The sleeve member 24 may be made of a suitable metal material or a suitable hard synthetic resin material, and includes a sleeve body 24a having an outer diameter that is slightly smaller than an inner diameter of the through hole formed in the panel 16, and a flange 24b integrally formed at one end of the sleeve body 24a. As best shown in FIG. 3, the sleeve body 24a has a small opening 24c formed at the other end side thereof, and a ridge element 24d integrally formed on the inner wall surface thereof and at one side of the other end thereof. Note, when the sleeve member 24 is made of the metal material, the ridge element 24d may be formed by pressing. The sleeve member 24 is inserted to the through hole of the panel 16 from the outer display surface side thereof, until the flange 24b is abutted thereagainst, as shown in FIG. 2. The insertion of the sleeve member 24 may be carried out by pulling up the same with a suitable tool engaged with the small opening 24c, if necessary.

Figure 4:
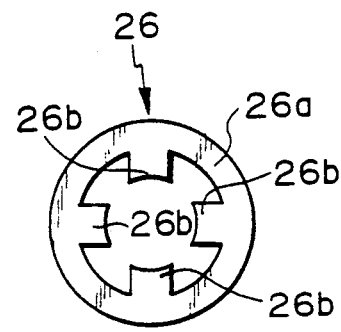
FIG. 4 is a plane view of a push-on or quick nut forming a part of the fixing device shown in FIGS. 2 and 3.

After the sleeve member 24 is inserted, the quick nut 26 is engaged with a portion of the sleeve body 24a projected from an inner surface of the panel 16. The quick nut 26 is preferably made of a steel material, and comprises an annular ring plate 26a and four pawl elements 26 integrally and inwardly extended therefrom, as apparent from FIGS. 3 and 4. The diameter of a circle defined by inner edges of the pawl elements 26b is slightly smaller than that of the sleeve body 24a, and accordingly, when the quick nut 26 is forcibly pressed onto the sleeve body 24a, the four pawl elements 26b are firmly engaged with the outer surface of the sleeve body 24a, whereby the sleeve member 24 is prevented from dropping out of the through hole of the panel 16.

The ferrule member 28 is made of a plastically deformable material such as a suitable metal or a suitable synthetic resin, and includes a tubular body 28a for receiving the optical fiber 18 therein, and a flange 28b integrally formed at one end thereof. As best shown in FIG. 3, the tubular body 28a has a reduced thin portion $28a_1$ and an enlarged thick portion $28a_2$ integrated therewith. The reduced thin portion $28a_1$ is swaged by a suitable tool after the optical fiber 18 is received in the ferrule 28, so that the received optical fiber 18 is immovably fixed within the tubular body 28a. Note, after the optical fiber 18 is fixed in the ferrule member 28, the end face of the optical fiber 18 is treated, if necessary. An outer diameter of the enlarged thick portion $28a_2$ is slightly smaller than the inner diameter of the sleeve body 24a, so that the ferrule member 28 can be inserted into the sleeve member 24 until the flange 28b of the ferrule member 28 is abutted against the end of the sleeve member 24, as shown in FIG. 2. Nevertheless, the ferrule member 28 must be forcibly inserted in the sleeve member 24 to enable it to pass over the ridge element 24d integrally formed on the inner wall surface thereof, i.e., the inserted ferrule member 28 is firmly held within the sleeve member 24 by the engagement of the ferrule member 28 with the ridge element 24d.

The ferrule member 28 held by the sleeve member 24 can withstand a pulling force of at least from 3 to 5 kg, and thus the ferrule member 28 is not easily removed from the sleeve member 24. In place of the ridge element 24d, projections may be formed on the inner wall surface of the sleeve member 24, so that the ferrule member 28 can withstand a pulling force of more than 5 kg. Note, in the embodiment as mentioned above, although the ridge element 24d is provided on the inner wall surface of the sleeve member 24, it may be formed on the outer surface of the ferrule member 28.

With the above arrangement of the fixing device 22, the implanting of the optical fibers 18 in the panel 18 is easier and quicker in comparison with the conventional implanting of optical fibers in which an adhesive is used for fixing the same, and thus the optical fiber display apparatus as shown in FIG. 1 can be advantageously assembled by use of the fixing device 22, especially on site. Preferably, a protective transparent board 30, which may be made of a glass or acrylic resin, is attached to the display surface of the panel 16, to protect the exposed end faces of the optical fibers 18 from pollution or contamination whenever necessary.

Figure 5:
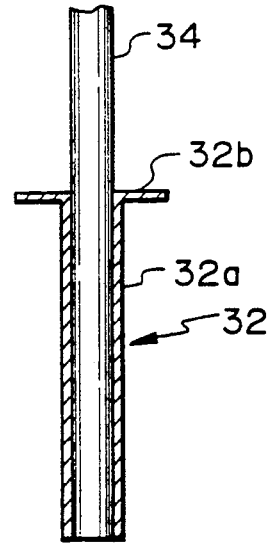
FIG. 5 is a longitudinal sectional view of a another type of ferrule member forming a part of the fixing device shown in FIGS. 2 and 3.

FIG. 5 shows another type of ferrule member, generally indicated by a reference numeral 32, which includes a thin tubular body 32a and a flange 32b integrally formed at one end thereof. The tubular body 32a has substantially the same diameter as the enlarged thick portion $28a_2$ of the ferrule member 28, but an inner diameter thereof is larger than that of the ferrule member 28 for receiving an optical fiber 34 having a larger diameter than that of the optical fiber 18. Namely, the single sleeve member 24 can be commonly used for the two ferrule members 28 and 32 in which the optical fibers 18 and 34 having different diameters are received. In the ferrule member 32, the tubular body 32a must be partially swaged before the optical fiber 34 can be fixed in the ferrule member 32. It is preferable to prepare various type ferrules having the same diameter and different inner diameters (for example, from 0.25 to 3.0 mm).

Figure 6:
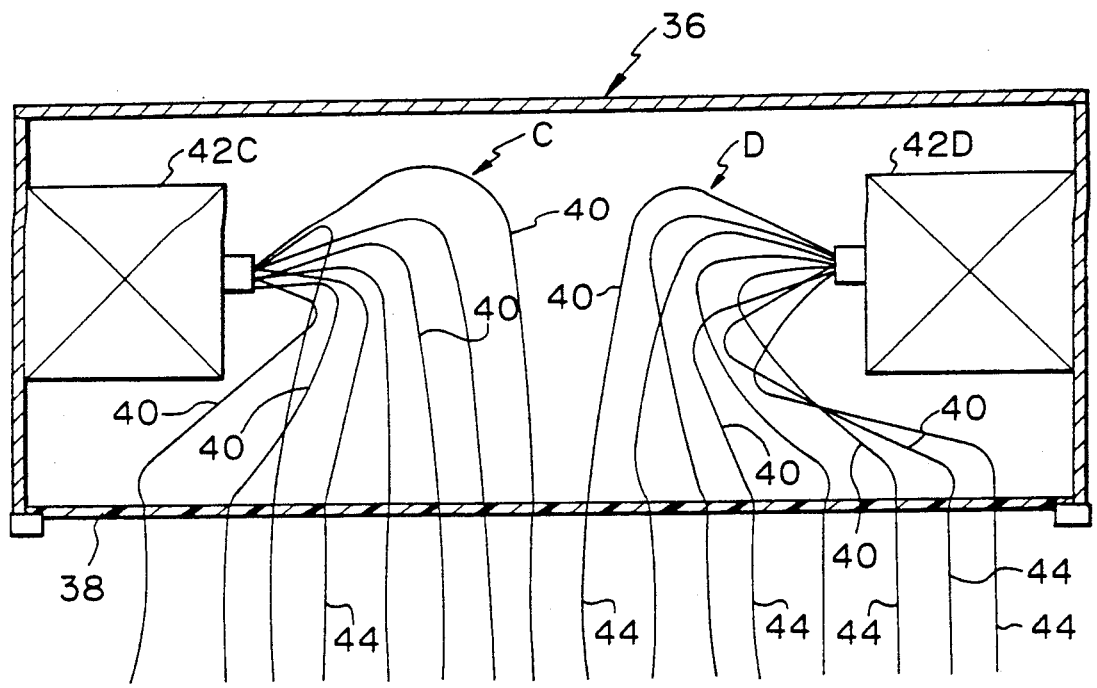
FIG. 6 is a schematic view of another type optical fiber display apparatus according to the present invention.
Figure 7:
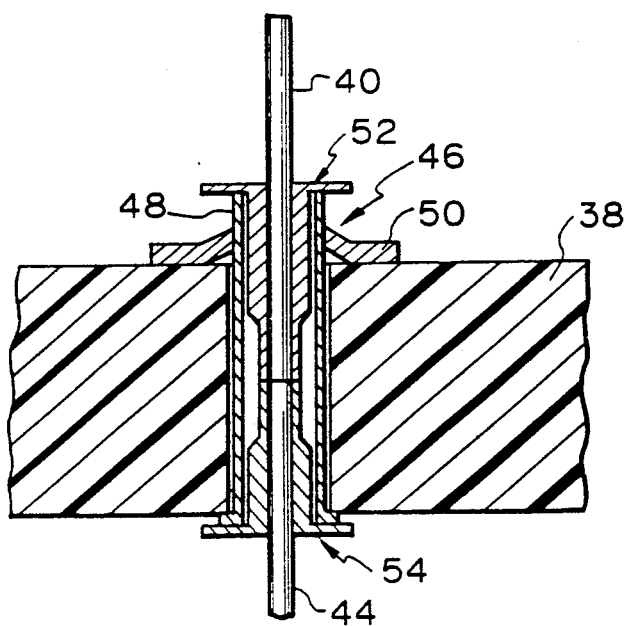
FIG. 7 is an enlarged longitudinal sectional view of a fixing device used in the optical fiber display apparatus shown in FIG. 6.
Figure 8:
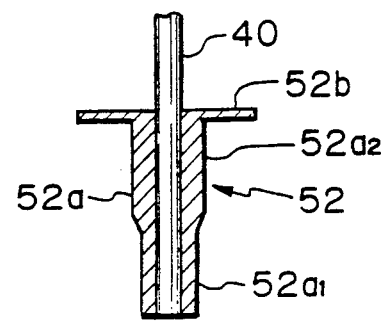
FIG. 8 is an exploded view of the fixing device shown in FIG. 7.
Figure 8:
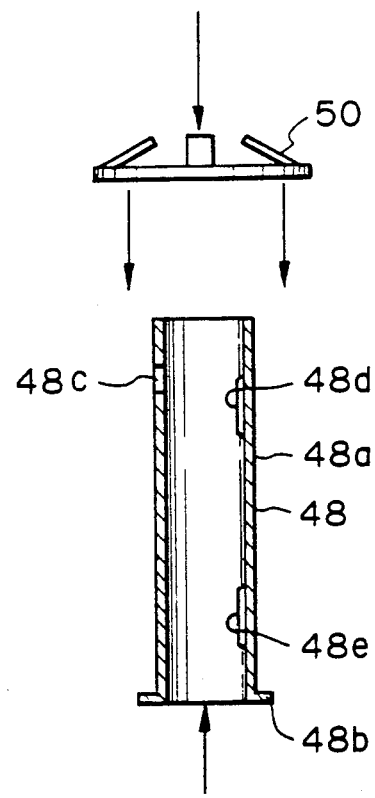
Figure 8:
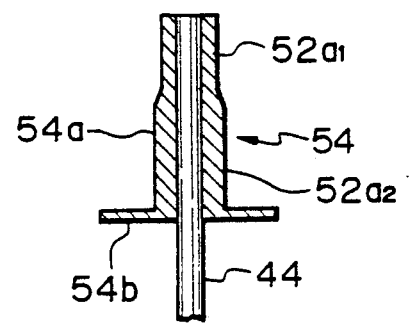

FIG. 6 shows an optical fiber display apparatus constituted as a decorative illumination such as a chandelier. This display apparatus comprises a box-like casing 36 which may be constituted in substantially the same manner as the casing 10. A bottom wall 38 of the casing 36 serves as a display panel in which a plurality of through holes are formed. The display apparatus also comprises a first plurality of optical fibers 40 which are divided into two groups C and D. The optical fibers of group C are gathered together at one end thereof and are optically connected to a light source 42C attached to an inner wall portion of the side wall frame of the casing 36. Similarly, the optical fibers of group D are gathered together at one end thereof and are optically connected to a light source 42D attached to an opposed inner wall portion of the side wall frame of the casing 36. The other ends of each of the optical fibers 40 of the groups C and D are implanted in the panel 38. The display apparatus further comprises a second plurality of optical fibers 44, one end of each is implanted in the panel 38 to be thus suspended therefrom, and is optically connected to the corresponding one end of the implanted optical fibers 40. The implanting and connecting of the optical fibers 40, 44 is carried out by using a fixing device 46 as shown in FIGS. 7 and 8.

The fixing device 46 comprises a sleeve member 48 inserted to the through hole formed in the panel 38, a push-on or quick nut 50 for engaging with and fastening the inserted sleeve member 48 to the panel 38, a first ferrule member 52 held by the sleeve member 48 and having the optical fiber 40 fixed therein, and a second ferrule member 54 held by the sleeve member 48 and having the optical fiber 44 fixed therein. The sleeve member 48 may be made of a suitable metal material or a suitable hard synthetic resin material, and includes a sleeve body 48a having an outer diameter sligthly than an inner diameter of the through hole formed in the panel 38, and a flange 48b integrally formed at one end of the sleeve body 48a. As best shown in FIG. 8, the sleeve body 48a has a small opening 48c formed at the side of the other end thereof, and first and second ridge elements 48d and 48e integrally formed on the inner wall surface thereof and at the sides of the ends thereof, respectively. When the sleeve member 48 is made of a metal material, the ridge elements 48d and 48e may be formed by pressing. The sleeve member 48 is inserted to the through hole of the panel 38 from the outer display surface side thereof until the flange 48b is abutted thereagainst, as shown in FIG. 7. The sleeve member 48 may be inserted by pulling up same with a suitable tool engaged with the small opening 48c, if necessary.

After the sleeve member 48 is inserted, the quick nut 50 is engaged with a portion of the sleeve body 48a projected from an inner surface of the panel 38. The quick nut 50 is substantially identical to the quick nut 26 shown in FIGS. 2, 3 and 4. Thus, when the quick nut 50 is forcibly pressed over the sleeve body 48a, the four pawl elements of the quick nut 50 are firmly engaged with the outer surface of the sleeve body 48a, whereby the sleeve member 48 is prevented from dropping out of the through hole of the panel 38.

The first and second ferrule members 52 and 54 are substantially identical to the ferrule member 28 shown in FIGS. 2 and 3. Namely, each of the ferrule members 52 and 54 is made of a plastically deformable material such as a suitable metal or a suitable synthetic resin, and includes a tubular body 52a, 54a for receiving the optical fiber 40, 44 therein and a flange 52b, 54b integrally formed at one end thereof. Also, each of the tubular bodies 52a and 54a has a reduced thin portion $52a_1$, $54a_1$ and an enlarged thick portion $52a_2$, $54a_2$ integrated therewith, as best shown in FIG. 8. The reduced thin portion $54a_1$, $54a_1$ is swaged by a suitable tool after the optical fiber 40, 44 is received in the ferrule 52, 54, so that the received optical fiber 40, 44 is immovably fixed within the tubular body 52a, 52a. Note, after the optical fiber 40, 44 is fixed in the ferrule member 52, 54, the end face of the optical fiber 40, 44 is treated, if necessary. The outer diameter of enlarged thick portion $52a_2$, $54a_2$ is slightly smaller than the inner diameter of the sleeve body 48a, so that the ferrule members 52 and 54 can be inserted to the sleeve member 24 from the opposed end sides thereof, until the flanges 52b and 54b are abutted against the opposed ends of the sleeve member 48 as shown in FIG. 7. Nevertheless, the ferrule members 52 and 54 must be forcibly inserted in the sleeve member 48 because of the ridge elements 48d and 48e integrally formed on the inner wall surface thereof, whereby the inserted ferrule members 52 and 54 are firmly held in the sleeve member 48 by the engagement of the ferrule members 52 and 54 with the ridge element 48d and 48e, respectively.

With the arrangement of the fixing device 46, the optical fibers 40 and 44 can be easily and quickly implanted in the panel 38 and thus the optical fiber display apparatus as shown in FIG. 6 can be advantageously assembled by use of the fixing device 22, especially on site.

In the embodiment shown in FIGS. 6, preferably, the optical fibers 44 suspended from the display panel 38 are constituted such that light can partially leak out of discrete locations on the surface of the optical fibers 44, whereby a decorative effect thereof can be increased.

Figure 9:
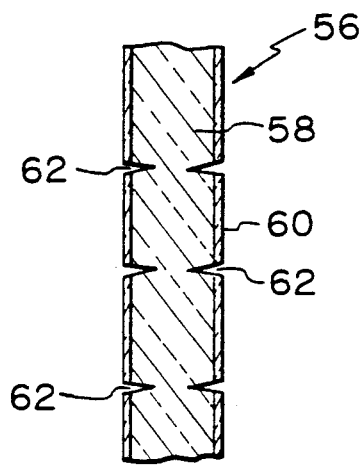
FIG. 9 is a longitudinal sectional view of a decorative optical fiber advantageously usable in the optical fiber display apparatus shown in FIG. 6.

FIG. 9 shows a decorative optical fiber which can be advantageously used as the optical fiber 44 This decorative optical fiber, generally indicated by a reference numeral 56, comprises a core 58 and a cladding 60 surrounding the same, and is characterized in that a plurality of cone-shaped openings 62 are discretely formed over the surface thereof. A light conducted in the core 58 is allowed to partially leak out of the openings 62, and thus a decorative effect of the optical fiber 56 is increased. The decorative optical fiber 56 is not susceptible to breaking, due to the cone shape of the openings 62. Preferably, the decorative optical fiber 56 is made of suitable synthetic resin materials to enable an easy formation of the cone-shaped openings 62. Namely, the cone-shaped opening 62 can be easily formed by a penetraton of a heated needle element into the core 58, through the cladding 60.

Figure 10:
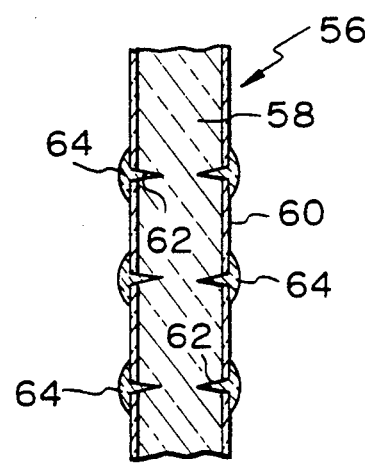
FIG. 10 is a longitudinal sectional view similar to FIG. 9, showing a modification of the decorative optical fiber shown in FIG. 9.

The cone-shaped openings 62 may be filled with a suitable transparent adhesive material 62, such as an ultraviolet-curing type adhesive, visible light-curing type adhesive, one-component type adhesive, two-component type adhesive or the like, as shown in FIG. 10, so that the decorative optical fibers 56 are strengthened against breakage. Preferably, the adhesive material 64 is made proud at the surface of the cladding 60, as shown in FIG. 10, so that the leaked light is scattered at the raised portion of the adhesive material 64, whereby the decorative effect is further increased. In the embodiment shown in FIG. 10, although the raised portion of the adhesive material 64 has a semi-spherical shape, it may have any other shape. Also, the adhesive material 64 may be colored by mixing a suitable dye therewith. Furthermore, lens elements may be inserted to the openings 60 and adhered thereto.

Figure 11:
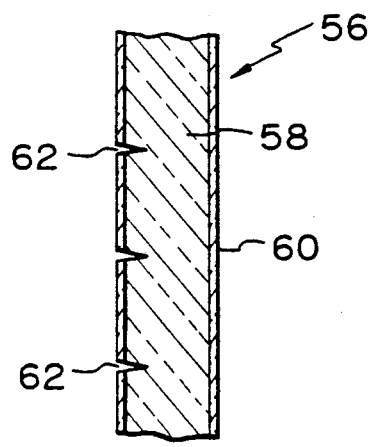
FIG. 11 is a longitudinal sectional view similar to FIG. 9, showing another modification of the decorative optical fiber shown in FIG. 9.

In the embodiment shown in FIG. 9, although the openings 62 are diametrically disposed over the surface of the optical fiber 56, they may be disposed along the surface of the optical fiber 56 at one side thereof, as shown in FIG. 11. Note, the arrangement of the cone-shaped openings 62 can be carried out in various ways. For example, the openings 62 may be helically or circularly disposed on the surface of the optical fiber 56.

Finally, it will be understood by those skilled in the art that the foregoing description is of preferred embodiments of the invention, and that various changes and modifications may be made to the present invention without departing from the spirit and scope thereof.

We claim:

1. An optical fiber display apparatus comprising:
a display panel;
a plurality of optical fibers, one end of each being optically connected to a light source, and the other end thereof being implanted in said display panel from one surface side thereof such that the end face thereof is exposed at the other surface of said display panel; and
means for implanting the other end of each of said optical fibers in said display panel, said implanting means including a sleeve member detachably inserted and held in a through hole formed in said panel and a ferrule member detachably inserted and held in said sleeve member, the other end of each of said optical fibers being received and fixed in said ferrule member.

2. An optical fiber display apparatus as set forth in claim 1, wherein said implanting means further includes a quick nut engageable with said sleeve member inserted to the through hole in said display panel, whereby said sleeve member is held therein.

3. An optical fiber display apparatus as set forth in claim 1, wherein said ferrule member is made of a plastically deformable material, and the fixing of the other end of each of said optical fibers in said ferrule member is carried out by a partial swaging of said ferrule member.

4. A fixing device for implanting one end of an optical fiber in a display panel so that the end face thereof is exposed at a display surface of said display panel, said device comprising:
a sleeve member detachably inserted and held in a through hole formed in said display panel; and
a ferrule member detachably inserted and held in said sleeve member, one end of said optical fiber being received and fixed in said ferrule member.

5. A fixing device as set forth in claim 4, further comprising a quick nut engageable with said sleeve member inserted to the through hole, whereby said sleeve member is held therein.

6. A fixing device as set forth in claim 4, wherein said ferrule member is made of a plastically deformable material, and the fixing of the one end of said optical fiber in said ferrule member is carried out by a partial swaging of said ferrule member.

7. An optical fiber display apparatus comprising:
an display panel;
a first plurality of optical fibers, one end of each being optically connected to a light source and the other end thereof is implanted in said display panel from one surface side thereof;

a second plurality of optical fibers, one end of each being implanted in said display panel from the other surface side thereof, whereby said first plurality of optical fibers are optically connected to said second plurality of optical fibers at the end faces thereof, respectively, said second plurality of optical fibers being suspended from the other surface side of said display panel; and means for implanting the other of each of said first plurality of optical fibers and the one end of each of said second plurality of optical fibers in said display panel, said implanting means including a sleeve member detachably inserted and held in each of said through holes formed in said display panel, a first ferrule member detachably inserted to said sleeve member from a side of one end thereof and held therein, and a second ferrule member detachably inserted to said sleeve member from a side of the other end thereof and held therein, the other end of each of said first plurality of optical fibers and the one end of each of said second plurality of optical fibers being received and fixed in said first and second ferrule members.

8. An optical fiber display apparatus as set forth in claim 7, wherein said implanting means further includes a quick nut engageable with said sleeve member inserted to the through hole of said display panel, whereby said sleeve member is held therein 9. An optical fiber display apparatus as set forth in claim 7, wherein said first and second ferrule member are made of a plastically deformable material, and the fixing of the other end of each of said first plurality of optical fibers in said first ferrule member and of the one end of each of said second plurality of optical fibers in said second ferrule member is carried out by a partial swaging of said first and second ferrule members, respectively.

10. A fixing device for implanting one end of a first optical fiber and one end of a second optical fiber in a display panel from the surface sides thereof, respectively, such that the end faces of said first and second optical fibers are optically connected to each other, said device comprising:

a sleeve member detachably inserted and held in a through hole formed in said display panel;

a first ferrule member detachably inserted to said sleeve member from a side of one end thereof and held therein, the end of said first optical fiber being received and fixed in said first ferrule member; and a second ferrule member detachably inserted to said sleeve member from a side of the other end thereof and held therein, the end of said second optical fiber being received and fixed in said second ferrule member.

11. A fixture device as set forth in claim 10, further comprising a quick nut engageable with said sleeve member inserted in the through hole, whereby said sleeve member is held therein 12. A fixture device as set forth in claim 10, wherein said first and second ferrule members are made of a plastically deformable material, and the fixing of the ends of said first and second optical fibers in said first and second ferrule members is carried out by a partial swaging of said first and second ferrule members, respectively.

13. A decorative optical fiber comprising:

a core; and a cladding surrounding said core, a plurality of cone-shaped openings being discretely formed in the surface thereof so that a light conducted in said core is allowed to partially leak out of said cone-shaped openings.

14. A decorative optical fiber as set forth in claim 13, wherein said cone-shaped openings are filled with a transparent adhesive material.

15. A decorative optical fiber as set forth in claim 14, wherein said adhesive material is made proud at the surface of the cladding, whereby the leaked light is scattered at the proud portion of said adhesive material.

* * * * *